United States Patent Office 3,737,432
Patented June 5, 1973

3,737,432
BRIDGED ISOCYANURATES
Thomas F. George, Clayton, and Daniel J. Lange, St. Louis, Mo., assignors to The P. D. George Company, St. Louis, Mo.
No Drawing. Original application Jan. 31, 1968, Ser. No. 701,826. Divided and this application June 17, 1971, Ser. No. 154,174
Int. Cl. C07d 55/14
U.S. Cl. 260—248 NS                    4 Claims

ABSTRACT OF THE DISCLOSURE

Bridged isocyanurate (BIC) derivatives and resins, including polyesters, polyester-amides, polyester-imides, polyester-amide-imides, etc., prepared from bridged isocyanurate derivatives, i.e. compounds or polymers containing at least two bridged isocyanurate units preferably derived from hydroxyalkyl, such as hydroxyethyl, isocyanurates and most preferably from tris (2-hydroxyethyl) isocyanurate or its equivalent. Examples of the bridging unit comprise (1) ether groups, (2) acetal groups, (3) carbonate groups, (4) hydrocarbon groups, (5) urethane groups and (6) combinations thereof, etc.

Resins derived from BIC derivatives may also be blended and/or copolymerized with hydantoin polymers to yield hydantoin BIC polymers. The hydantoin polymers employed may be prepared by reacting polyglycines and polyisocyanates, and most preferably diglycines and diisocyanates.

These resins may be cured by using conventional curing agents, curing resins such as melamine-aldehyde, phenol-aldehyde, etc. resins.

These resins may be employed in electrical insulation, particularly as wire enamels, and for other uses.

---

This application is a division of our application S.N. 701,826, filed Jan. 31, 1968 entitled "Bridged Isocyanurate-Containing Resins."

This invention relates to resins including polyesters, polyester-amides, polyester-imides, polyester-amide-imides, etc., prepared for bridged isocyanurate (BIC) derivatives, i.e. compounds or polymers containing at least two bridged isocyanurate units preferably derived from hydroxyalkyl, such as hydroxyethyl isocyanurates, and most preferably from tris(2-hydroxyethyl) isocyanurate of its equivalent. Examples of the bridging unit comprise (1) ether groups, (2) acetal groups, (3) carbonate groups, (4) hydrocarbon groups, (5) urethane groups, (6) combinations thereof, etc. This invention also relates to bridged isocyanurates.

This invention also relates to these resins blended and/or copolymerized with hydantoin polymers to yield hydantoin-BIC polymers. The hydantoin polymers employed may be prepared by reacting polyglycines and polyisocyanates and most preferably diglycines and diisocyanates.

These resins may be cured by using conventional curing agents, curing resins such as melamine-aldehyde, phenol-aldehyde, etc. resins, etc.

This invention also relates to the above resins employed in electrical insulation, particularly as wire enamels, and for other uses.

Synthetic resins suitable for use as electrical insulating materials, particularly materials which are satisfactory for use as slot insulation in dynamoelectric machines and for use as insulation for conductors which are to be employed as magnet wires (insulated electrical conductors) in electrical apparatus must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as ketones, alcohols, aliphatic and aromatic hydrocarbons, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact that there may be a large potential gradient between adjacent turns, it is necessary that the resins employed as wire enamels have a high dielectric strength to prevent short circuiting between adjacent coated wires. In the operation of electrical apparatus containing coiled wires, high temperatures are often encountered and the enamels must be able to withstand these high temperatures as well as the mechanical stresses and vibrations encountered in electrical apparatus so that the enamel coating does not soften, crack, or come off the wire.

Isocyanurate monomers are known which are polyfunctional derivatives of isocyanuric acid containing a plurality of —alkyl—OH groups, where the alkyl group is straight chain or branched and where the alkyl has for example 1–10 or more carbons, such as 2–4 carbons, but preferably 2 carbons, for example compounds of the formula:

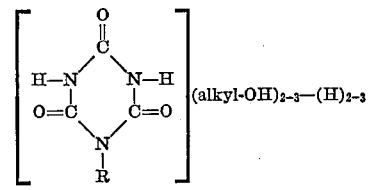

where R is hydrogen or a substituted group, such as a hydrocarbon group, for example alkyl, aryl, cycloalkyl, etc., e.g. methyl, ethyl, propyl, butyl, etc., phenyl, cyclohexyl, etc., but preferably compounds of the formula

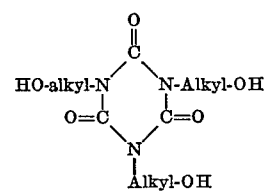

These isocyanuric derivatives are conveniently prepared as follows:

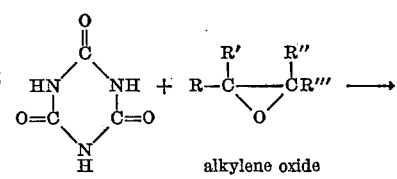

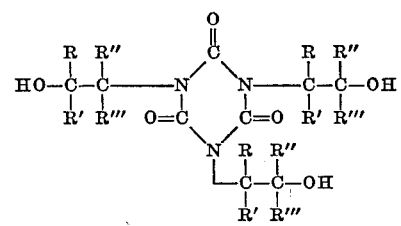

where the R's are preferably hydrogen or an alkyl group, for example where the alkylene oxide is ethylene, propylene, butylene, octylene, etc. oxides.

These isocyanurate derivatives have been employed in preparing resins.

We have now prepared resins from bridged isocyanurates having improved mechanical, chemical, electrical and thermal properties which are adaptable for use as insulation for electrical conductors, such as for the use as magnet wire insulation, as slot insulation in electrical apparatus, etc.

We have prepared polyester resins from (1) polycarboxylic acids, esters, etc., (2) glycols and (3) polyols, wherein (2) or (3) are replaced in whole or in part by bridged isocyanurate derivatives.

Furthermore, we have prepared polyester resins containing BIC derivatives which may be cross-linked with conventional cross-linking agents, such as for example polyisocyanates including the blocked isocyanates of the Mondur type (Mobay Chem. Co.).

We have also prepared polyester-amides, polyester-amide-imides polyester-imides containing BIC derivatives, for example such resins containing BIC derivatives prepared from dicarboxylic acids such as phthalic acids, etc., tricarboxylic acids such as trimellitic acid, etc., and tetracarboxylic acids such as pyromellitic acids, etc. reacted with polymaines such as diamines, hydroxyamines, such as alkanolamines, with or without glycols or polyols. These resins may also be cured or cross-linked.

We have also prepared resins containing BIC derivatives prepared with fatty acids and/or oils, for example of long, medium and short oil content.

Thus, our invention includes but is not limited to the following:

(1) Resins which contain BIC derivatives.
(2) The cured product of (1).
(3) Resins containing BIC derivatives which are modified with conventional curing or modifying agents, with or without metal catalysts.
(4) Resins containing BIC derivatives prepared with oils.

Our invention includes the use of these resins in surface coatings, laminates, films, electrical insulators, especially as wire enamels, such as electrical insulators for insulating magnet wire, as slot insulation in dynamoelectric machines; and the use of these resins which have been "overcoated" with suitable materials.

The resins of this invention when cured on an electrical conductor provide excellent insulation.

The resins of this invention are characterized by the presence of bridged isocyanurate derivatives where the resulting bridged derivatives contain a reactive hydroxyl group. The term "bridged isocyanurate derivatives" means a compound or polymer containing at least two bridged isocyanurate units which contain hydroxyl units capable of forming polyesters, polyester-amides, polyester-imides, polyester-amide-imides, etc. In the preferred embodiment, these compounds contain hydroxyalkyl groups and most preferably hydroxyethyl groups. In these reactions, the bridged isocyanurates having two reactive hydroxy units react as glycols or polyols where three or more hydroxy units are present.

The bridging means may be any suitable group, for example (1) an ether group
(2) an acetal group
(3) a carbonate group
(4) a hydrocarbon group
(5) a urethane group
(6) any other suitable group.

Ethers of hydroxy isocyanurates are prepared by any suitable method. One suitable method is described in U.S. Pat. 3,293,224.

These may be illustrated by the following equations:

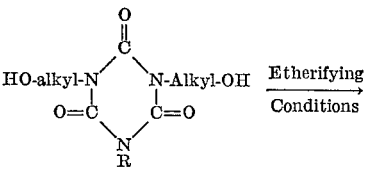

$R = H$ or a substituted group.

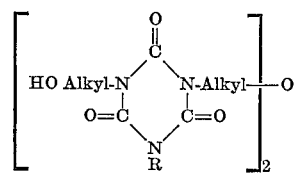

and/or

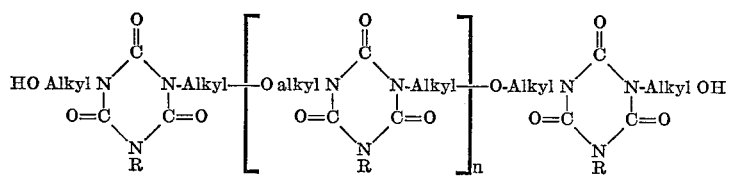

$n = 1-25$ such as 1 to 10, for example, 1–5, or more.

In the case of tris(hydroxyl-alkyl) isocyanurates, as illustrated by tris(hydroxyalkyl) isocyanurates, the following reactions are illustrative:

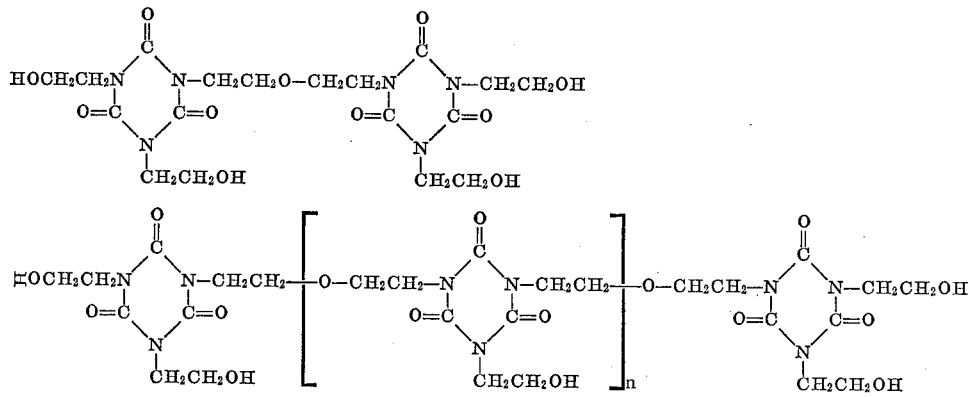

$n$ has the same values as above.

In addition, bridging etherification can take place between two or more chains, for example,

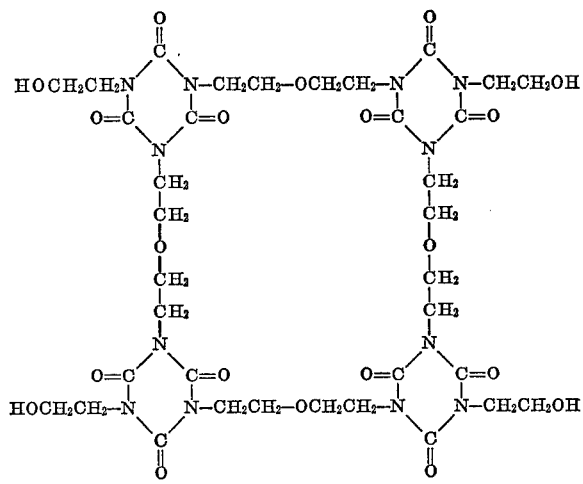

Analogous bridging etherification may also take place between more highly polymeric chains of isocyanurate ethers.

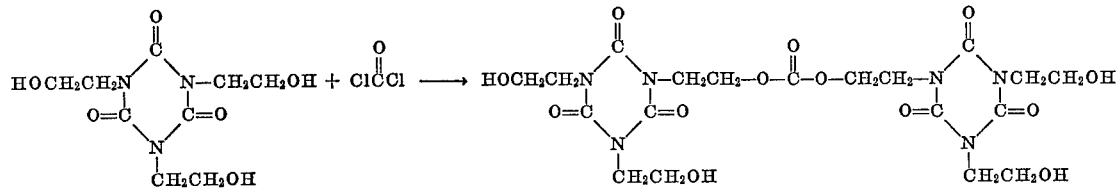

In addition to the above reaction, etherification can also be effected by the following type of reaction:

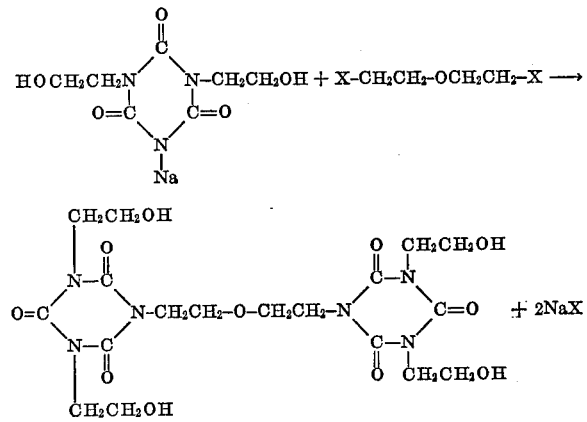

where X is halogen, i.e. chlorine, bromine, etc.

Analogous species can also be prepared from other compounds.

In addition, the side chain may also contain plural oxyalkyl units —(Alkyl O)$_n$OH prior to etherification whereby two or more isocyanurate units are joined, i.e., Ⓝ—(Alkyl O)$_n$ alkyl—O—alkyl (O-alkyl)$_n$—Ⓝ where Ⓝ represents the isocyanurate unit.

In addition to etherification, isocyanurate units be joined by formal or other analogous aldehyde-derived linkages, for example of the formula

where R is a substituted group such as hydrogen, hydrocarbon, i.e., alkyl, aryl, cycloalkyl, heterocyclic, etc. Thus, in all the above formulae a formal or acetal linkage will replace the ether linkage, i.e.

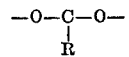

in place of

In the case of polyaldehydes such as glyoxal, the following structure may be formed:

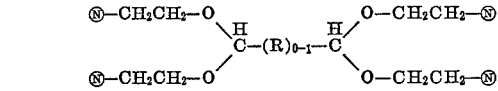

Ⓝ=an isocyanurate unit.

A plurality of isocyanurate units can also be bridged by non-ether groups, for example, by carbonate bridges such as

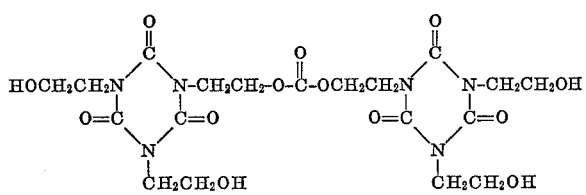

These are formed by reacting phosgene or carbonate esters with the hydroxy isocyanurates.

The above reactions can also produce a polymer having a plurality of carbonate units. Isocyanurate units can also be joined by hydrocarbon bridges for example according to the following equation:

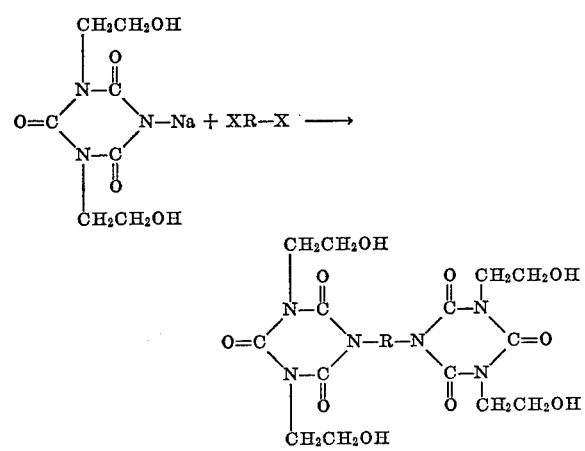

where R is a hydrocarbon group, for example straight chain and branched alkylene, i.e. ethylene, propylene, butylene, etc., arylene, i.e. phenylene, naphthyl, etc., cycloalkyl, alkarylalkyl i.e. —CH$_2$ArCH$_2$— such as xylylene, etc. alkenyl, alkinyl, for example —CH=CH—, —C≡C—, etc.

Bridging groups may also be derived from urethanes derived from polyisocyanates preferably diisocyanates, such as of the formula R(CNO)$_2$, R(CNS)$_2$, etc., where R is an organic radical, preferably hydrocarbon, such as alkyl, aryl, cycloalkyl, alkaryl, etc. substituted derivatives thereof, including the inclusion of oxygen, sulfur, nitrogen, etc. containing groups. The following is presented as a typical reaction:

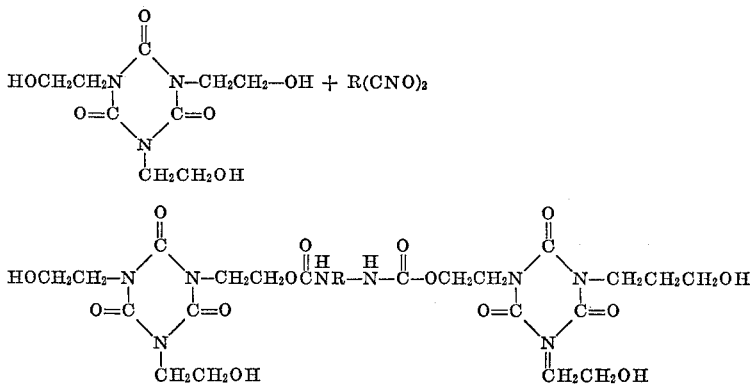

Thus, the BIC derivatives of this invention are isocyanurate groups which are bridged by any suitable groups, of which the above groups are illustrative, yielding a product, which after bridging, has hydroxy groups capable of esterification so as to form a resin, preferably having at least two hydroxy groups, such as 2–10 or more but preferably 4–6 hydroxy groups. The preferred embodiment is the bis isocyanurate derivative as illustrated with THIC derivatives.

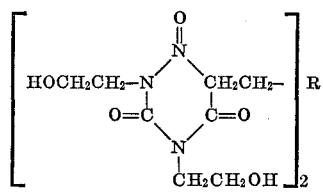

where R is the bridging group such as those illustrated above.

Most preferably R is oxygen so as to yield the bis ether

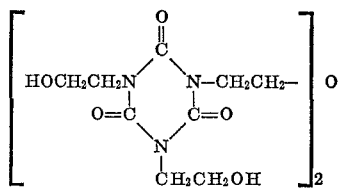

Provided the final product contains BIC derivatives, a wide variety of polycarboxylic acids, glycols, and polyols can be employed.

A wide variety of polycarboxylic acids, or esters thereof can be employed in the preparation of the polyesters of this invention. In general these include the polycarboxylic acids conventionally employed in the preparation of polyesters. These acids may possess two, three, four or more carboxyl groups, may be aliphatic, alicyclic, heterocyclic, aromatic, etc., and may be saturated or unsaturated. Examples of such acids include the alkanedicarboxylic acid, for example those of the formula

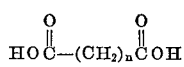

where $n=1-10$ or more such as malonic, succinic, glutaric, adipic, pimelic, suberic, azelaic, sebacic, etc., acids, isomers thereof where the alkylene group is branched and/or one or more of the carboxyl groups is not terminal; substituted alkanedicarboxylic acids such as chlorosuccinic, etc.; alicyclic dicarboxylic acids, such as cyclohexanedicarboxylic acid, etc.; aromatic acids such as phthalic, isophthalic, terephthalic, diphenic, hemimellitic, trimellitic, 1,8-naphthalenic acid, pyromellitic acids, benzo- phenone dicarboxylic acid, dichlorophthalic acids; unsaturated acids such as fumaric, maleic, muconic, citraconic, mesaconic, glutaconic (cis and trans), aconitic (cis and trans), bromo-maleic, etc.; hydroxyacids such as citric, malic, tartaric, etc. acids; dimeric fatty acids such as dilinoleic acids, etc.; tris-(2-carboxyethyl) isocyanurate; adducts of maleic acids with various unsaturated and/or conjugated hydrocarbons such as diisobutylene, butadiene, rosin, abietic acid, terpolene, cyclopentadiene, linoleic acid, etc.; diglycollic acid, ethylenebisdiglycollic acid, etc.

The preferred polycarboxylic acids are the dicarboxylic acids containing from 2 to 10 carbon atoms, such as succinic, glutaric, adipic, suberic, maleic, phthalic, isophthalic, terephthalic, and the like. Particularly preferred polycarboxylic acids are the aromatic dicarboxylic acids, containing from 6 to 10 carbon atoms wherein the two carboxylic groups are attached directly to the aromatic nucleus such as the phthalic acids, but most preferably isophthalic and terephthalic acids.

In some cases it may be desirable to utilize other forms of the acids, such as the acid anhydrides or acid chlorides, such as phthalic anhydride, maleic anhydride, trimellitic anhydride, pyromellitic anhydride, succinic chloride, and the like.

The esters of the polybasic acids may be utilized where the resins are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, propyl alcohol, butyl alcohol and amyl alcohol.

The glycol (apart from the BIC derivatives) employed in preparing the resins can vary widely. In general, they are the glycols conventionally employed in preparing polyesters. Suitable examples include the following: alkylene glycols of the formula $H(OA)_nOH$ where $n$ is for example 1–10 or higher and A is alkylene; ethylene; propylene, butylene, etc., for example ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol, etc. Preferably, one employs an alkane-diol of the general formula $HO(CH_2)_nOH$ where $n=2-5$ or isomers thereof. The preferred glycol is ethylene glycol.

The polyols (apart from BIC derivatives) used in the preparation of the resins of this invention can vary widely and are those containing at least three esterifiable hydroxyl groups. In general, these are the polyhydric alcohol conventionally employed in preparing polyesters. Illustrative examples of such alcohols are glycerol, polyglycerol, pentaerythritol, mannitol, trimethylolpropane, trimethylolethane, 1,2,6-hexanetriol, polypentaerythritol, polyallyl alcohol, polymethallyl alcohol, tris(2-hydroxyethyl)isocyanurate (THIC), polyols formed by the condensation of bisphenols with epichlorohydrin, and the like.

Preferred polyhydric alcohols to be used in the preparation of these polyesters are the aliphatic alcohols possessing from 3 to 6 hydroxyl groups and containing from 3 to 14 carbon atoms, such as glycerol, pentaerythritol, mannitol, 1,4,6 octanetriol, 1,3,5-hexanetriol and 1,5,10-dodecanetriol. Other preferred alcohols include THIC.

It should be understood that mixtures of more than one polycarboxylic acid, more than one glycol and more than one polyol can be employed.

The ratio of (1) polycarboxylic acids to (2) glycols to (3) polyols can vary widely depending on many variables such as the specific compounds employed, the intended use, the modifying agents, etc. BIC compounds are included within (2) and (3).

For example, the polyester can comprise the product of (1) from about 20 to 65 equivalent percent, such as from about 25 to 55% but preferably from about 35 to 50% of a polycarboxylic acid; (2) from about 5 to 40 equivalent percent, such as from about 10 to 35% but preferably from about 8 to 20% of a glycol (including BIC derivatives); and (3) from about 10 to 75 equivalent percent, such as from about 15 to 60%, but preferably from about 20 to 50% of a polyol (including BIC derivatives). The sum of (1), (2) and (3) above equals 100 equivalent percent.

In the preferred specific polyester of the present invention where a phthalic acid, preferably iso- or terephthalic acids, BIC and a glycerol and/or ethylene glycol are reacted, the ratio employed to achieve an excellent product is as follows:

(1) The phthalic acid such as iso- and terephthalic acids of from about 40 to 60, for example from about 45 to 55, but preferably about 47 to 52 equivalent percent.

(2) Ethylene glycol and/or BIC (difunctional) from about 5 to 35, for example from about 8 to 30, but preferably from about 15 to 25 equivalent percent.

(3) Glycerol and/or BIC (trifunctional or higher), from about 15 to 60, for example from about 20 to 50, but preferably from about 25 to 45 equivalent percent.

The polyester resins of the present invention may be prepared in fairly conventional ways. Thus, the lower dialkyl ester of terephthalic acid or isophthalic acid, BIC derivative and the polyhydric alcohol and/or glycol are added to any suitable reaction vessel and reacted. This reaction vessel may be formed of any suitable material such as glass, stainless steel or any of the other metals commonly employed in processing polyester resins. Since the reaction involved in forming the polyester resins of the present invention is essentially an alcoholysis reaction, the net effect of the reaction is to substitute a polyhydric alcohol or a glycol for the lower alkyl radical of the lower dialkyl isophthalates or terephthalates with the concurrent liberation of the lower alcohol. In the case of the dimethyl esters of the acids the alcohol which is liberated is methanol. Therefore, suitable means should be provided for eliminating the methanol or other lower alcohols liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condense the sublimate while allowing the lower alcohol vapors to escape.

Since alcoholysis reactions are rather slow when run without catalysts, we prefer to use alcoholysis catalysts when preparing the polyester resins of the present invention. Among the many alcoholysis catalysts which may be used are included for example, lead oxides, lead acetate, zinc oxide, cadmium acetate, cuprous acetate, zinc acetate, magnesium acetate, beryllium acetate, stannic acetate, ferric acetate, nickel acetate, etc. The amount of catalyst employed is no critical and may vary over a wide range depending on the particular polyester system under consideration. In general, we employ from about 0.01 to about 5 percent, by weight, of the alcoholysis catalyst, based on the total weight of polyester resin. Higher concentrations of such catalyst may be employed but no advantage is gained by such use. Preferably we employ about 0.1 percent, by weight, of the metallic component of catalyst based on the total weight of the resin employed.

In preparing the polyester resins of the present invention we have found it desirable to heat the reactants to obtain as high a molecular weight material as possible without causing gelation of the resulting product. The reaction is accomplished by heating the reactants from room temperature to a temperature of about 390 to 500° F. but preferably 400–450° F. over a period of from two to ten or more hours. During the initial heating period it is sometimes found that sublimation of the lower dialkyl esters of the acids employed begins to occur. To prevent this sublimation, xylene or some similar material may be added to the reaction mixture to keep the lower dialkyl ester of the acid in solution. The xylene or other similar material takes no part in the reaction and is distilled from the reaction mixture during the course of the reaction. Any water which is present in the raw materials employed in the reaction is also distilled from the reaction mixture during the heating process. One source of moisture commonly found in the reaction mixture is the water which may be dissolved in the polyol.

The alcoholysis catalyst may be added to the reaction mixture at the beginning of the heating period or after the reactants have been heated for a short length of time to remove any water present in the raw materials employed. After heating the reactants to the desired final temperature between about 390 and 500° F. but preferably 400–450° F. the reaction may be stopped or the product may be maintained at the final temperature for another 2 to 4 hours to increase the molecular weight. When the product is maintained at this final temperature it is necessary to stop the reaction before the resin reaches such a high molecular weight that gelation occurs.

The reaction is generally terminated by pouring a suitable solvent into the hot polyester resin to form a solution having a solids content of about 25 to 50 percent, by weight. This solution is then filtered to remove any insoluble matter. Among the many solvents suitable for the polyester resins employed in the present invention may be mentioned cresylic acid, m-cresol, xylenols, polyhydroxy benzenes, xylene and other polyalkyl benzenes, high boiling petroleum hydrocarbons, such as Solvesso 100, Solvesso 150, the M. L. solvents such as dimethyl formamide, dimethyl acetamide, the vinyl pyrrolidones, etc.

Instead of dissolving the polyester resins of the present invention in a solvent, it is sometimes desirable to use the resinous materials without a solvent being present. For these applications the resin is merely allowed to cool down to room temperature without the addition of any type of solvent. This results in a brittle solid mass which may be ground into a powder if desired for further use. Where the resin has been obtained in powder form and it is subsequently desired to use it in solution, the resin may be added to a suitable solvent and the mixture heated up to a temperature of about 212° F. until complete solution of the resin takes place.

The present invention also relates to oil-modified resins derived from BIC-containing resins which are prepared with fatty acids and/or oils, for example of long, medium, or short oil content; to uses therefor, including electrical conductors coated therewith; and more particularly to the use of said oil-modified polyesters as electrical insulating varnishes.

We have particularly found that said oil or fatty acid modified polyesters, particularly those containing certain resins, for example oil-soluble phenol-aldehyde resins, can be made into outstanding electrical insulating varnishes. In the preferred embodiments we have found that certain oil or fatty acid modified polyesters prepared from a polycarboxylic acid and BIC derivatives particularly those which contain a glycol and/or polyol, and more particularly those which also contain oil soluble resins, such as phenol-aldehyde resins, can be used to prepare outstanding electrical insulating varnishes.

In general, the compositions of the present invention are prepared by employing a fatty acid or oil in conjunction with BIC resins so as to produce the corresponding oil modified resins. The general process for preparing oil modified resins is so well known to the art that we shall not go into such preparation in great detail. Preparation can be effected by alcoholysis or acidolysis.

Representative fatty oils which may be used in the practice of the present invention are included the non-drying, semi-drying, and drying fatty oils, including vegetable oils, animal oils, marine oils and treated marine oils, such as soya, cottonseed, hydrogenated cottonseed, linseed, castor, hydrogenated castor, dehydrated castor, cocoanut, tung, oiticica, menhaden, hempseed, grapeseed, corn, codliver, candelnut, walnut, perilla, poppyseed, safflower, conjugated safflower, sunflower, rapeseed, Chinawood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids including fatty acids may be illustrated by the following: abietic acid, benzoic acid, caproic acid, caprylic acid, castor fatty acid, coconut fatty acid, cottonseed fatty acid, crotonic acid, DCO FA, i.e. primarily

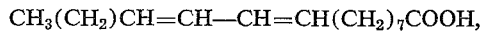

2-ethyl hexoic acid, lauric acid, linoleic acid, linolenic acid, linseed FA, oleic acid, pelargonic acid, Rosin acid (AN 165), soya FA, Tall Oil FA (AN 195, AN 192), etc.

Percentage oil length normally refers to the oil portion of the resin expressed as a percentage of the total weight of the finished resin. It is equal to the weight of any fatty acid in the resin taken together with the weight of a polyol needed to completely esterify this fatty acid (minus weight of evolved water of esterification) expressed as a percentage of the total solids content of the finished resin.

Thus, for purposes of this invention an oil modified polyester includes polyesters modified with fatty acids as well as oils. The oil-modified polyesters may be of long, medium or short oil content, but is preferably of long oil content; where a fatty acid is employed, it may also be long, medium or short, i.e. having proportionate ranges of fatty acids calculated as glycerides and/or BIC derivatives as compared to the oils. These terms have the following meanings: Short oil 30–45%; medium oil 45–55%; long oil 55–75%, weight of oil based on total weight of the polyester formulation including the oil. Lesser amounts of oil such as 25% or lower or greater amounts of oil, such as 75–80% or greater, may be employed in certain instances.

The oil modified polyester resins of this invention can be further modified by employing various resins in conjunction therewith.

Included among such resins are phenol-aldehyde resins, phenol-sulfur resins, phenol-acetylene resins, including resins produced from phenol and substituted phenols, including difunctional, tri-functional and tetrafunctional phenols, naphthols, bisphenols, salicylic acid and salicylates, etc., modified phenolic resins, including phenol-terpene resins, phenol-terpene-aldehyde resins, phenol-naphthalene-aldehyde resins, phenol-urea-formaldehyde resins, phenol-aniline-formaldehyde resins, phenolglycerol resins, etc., non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

The compositions of this invention can be employed to prepare insulating varnishes and in particular varnishes yielding electrical conductor coatings having improved properties. These varnishes are particularly valuable for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors, and other electrical equipment.

In preparing the insulating varnishes of the present invention, in addition to the oil modified polyester resins there is normally used an oil-soluble phenol-aldehyde resin. The phenol-aldehyde resin gives the varnish heat reactivity, improves electrical properties, aids in the cure and lends hardness and abrasion resistance to the product. Among the oil-soluble phenol-aldehyde resins which can be used are p-tertiary octylphenol-formaldehyde, p-phenyl-phenol-formaldehyde, 2,2-bis(p-hydroxyphenyl) propane-formaldehyde and o-tertiary butylphenol-formaldehyde. Other suitable phenol-formaldehyde resins are shown in Honel Pat. 1,800,296. Substituted phenols alone or in conjunction with unsubstituted phenol can be used in forming the oil-soluble phenolic resin. While the phenolic resin can be prepared using an acid catalyst, they are generally prepared using alkaline catalysts as is well known in the art. Thus, the p-tertiary butylphenol-formaldehyde resin employed may be prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The oil-soluble phenol-formaldehyde resins are of the heat-reactive type. The oil-soluble phenol-formaldehyde resin is usually employed in an amount of 10% to 80% by weight of the total of the oil modified polyester and phenolic resin, such as 15–40%, but preferably 20–30%. Increasing the amount of phenolic resin speeds the cure but also sacrifices ageing characteristics. Hence, the amount of phenolic resin is preferably kept at about 20% by weight. It is also possible to eliminate the phenolic resin from the varnish with resulting loss of the advantages from having the phenolic resin present. It is also possible to replace part of the phenolic resin with other heat-reactive resins, e.g., furane resins, triazine resins, urea-formaldehyde, melamine-formaldehyde and epoxy resins, e.g. bisphenol A-epichlorohydrin resin, although the preferred heat-reactive resins are phenolic resins since they impart the best combination of improved properties, all things considered. Rosin-modified phenolics are also advantageously employed.

In addition to the resin components, the insulating varnish also includes one or more solvents, such as xylene, mineral spirits, isophorone, naphtha, toluene, etc.

The insulating varnishes of the instant invention have properties which warrant their use at Class H temperatures. They can withstand temperatures in excess of 180° C. for the normal life of a motor or transformer in which they are utilized. The cured varnishes are highly resistant to oil, chemicals and moisture.

The varnishes in accelerated ageing tests have retained their toughness, flexibility, excellent bonding strength and high dielectric properties after heat ageing for as long as 20,000 hours at over 200° C., based on extrapolated values. The varnishes can be applied by vacuum impregnation or free dip system. They cure readily under infrared heat or in forced air ovens. Baking is normally done at 375° F. to 400° F., although lower temperatures can be used.

A typical insulating varnish is prepared by formulating the resin of this invention with a phenolic resin, usually in a dilute solution for example from about 25–75% solids, but preferably as a 50% solution. Other conventional additives can be employed, for example a drier or curing agent may be employed, for example manganese, zinc, lead, titanium, cadmium, boron, thorium, etc. salts, such as the naphthenates, octoates, tallates, etc., thereof for example in ratios of 1–10 parts or more of drier per 1000 parts by weight of polyester resin.

The following is a typical formulation:

EXAMPLE A

| | Parts by weight |
|---|---|
| BIC resin | 1000 |
| Phenolic resin | 200 |

The above is employed as a 50% solution containing the above solids.

IMINO AND/OR AMIDES CONTAINING BIC DERIVATIVES

In addition to polyester resins prepared from BIC derivatives, one can also employ BIC derivatives in combination polyamide-polyester resin, polyimide-polyester resins, polyamide-polyimide-polyester resins. For example, when tetracarboxylic acids are reacted with a polyamine there are formed polymers of the formula:

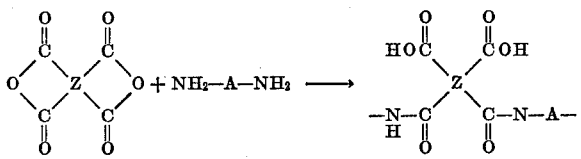

which react further at higher temperatures to form polyimides, for example

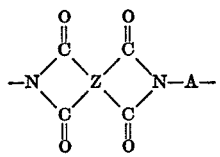

BIC derivatives can be employed to modify these resins.

Similarly when tricarboxylic acids react with polyamines, polyimide-amides are formed, for example

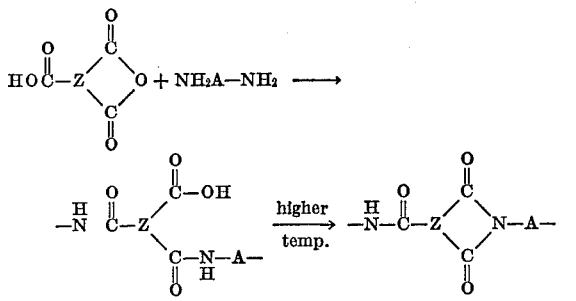

where Z is the moiety of the polycarboxylic acid, such as aliphatic, cycloaliphatic, arylic, etc., but preferably arylic; and A is the moiety of the polyamine, for example aliphatic, cycloaliphatic, arylic etc., but preferably arylic. BIC compounds can also be employed to modify these resins.

The tetracarboxylic acid dianhydrides useful in this invention are characterized by the following formula:

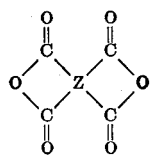

where Z is a tetravalent radical, e.g., aromatic, aliphatic, cyclo-aliphatic, combination of aromatic and aliphatic, or substituted group thereof. The preferred dianhydrides are those in which the Z groups have at least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical to provide a 5-membered ring as follows:

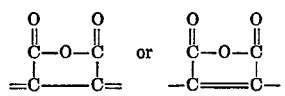

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; benzophenone tetracarboxylic dianhydride, 1,2,5,6-naphthalene tetracarboxylic dianhydride; 2,2',3,3' - diphenyl tetracarboxylic dianhydride; 2,2-bis(3,4-dicarboxyphenyl) propane dianhydride; bis(3,4-dicarboxyphenyl) sulfone dianhydride; perylene 3,4,9,10-tetracarboxylic acid dianhydride; bis-(3,4-dicarboxyphenyl) ether dianhydride; bis(3,4-dicarboxyphenyl) sulfone dianhydride and ethylene tetracarboxylic acid dianhydride.

Although trimellitic acid or its anhydride (TMA) is the preferred tricarboxylic acid, other suitable tricarboxylic acids or anhydrides can be employed, for example,

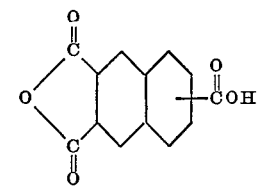

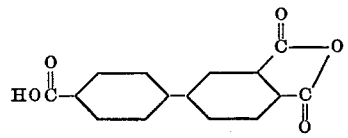

where Q is for example alkylene such as

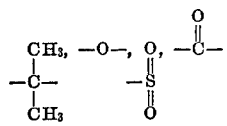

etc.

The organic diamines usable in preparing imides and/or amides are those having the structural formula $H_2N—A—NH_2$, wherein A, a divalent radical containing at least two carbon atoms, may be aromatic, aliphatic, cycloaliphatic, a combination of aromatic and aliphatic or substituted groups thereof, etc. The most useful diamines are the primary diamines which, upon reaction with the trifunctional acids may provide polyamide-acids which are then converted into the polyamide-imides. The preferred A groups in these diamines are those containing at least six carbon atoms and characterized by benzenoid unsaturation. More specifically these groups are:

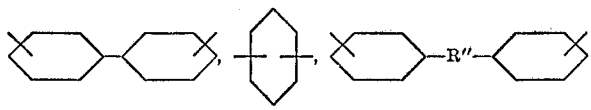

and the like, where R″ is hydrocarbon, nitrogen-containing, oxygen-containing, silicon-containing, phosphorus-containing, sulphur-containing, etc.

Among the diamines which are suitable for use in the present invention are:

4,4′-diamine-diphenyl propane;
4,4′-diamino-diphenyl methane;
benzidine;
3,3′-dichloro-benzidine;
4,4′-diaminodiphenyl sulfide;
3,3′-diamino-diphenyl sulfone;
4,4′-diamino-diphenyl sulfone;
4,4′-diamino-diphenyl ether;
1,5-diamino-naphthalene;
meta-phenylene-diamine;
para-phenylene-diamine;
3,3′-dimethyl-4,4′-biphenyl diamine;
3,3′-dimethoxy benzidine;
bis-(beta-amino-t-butyl) toluene;
bis(para-beta-amino-t-butyl-phenyl) ether;
bis-(para-beta-methyl-delta-amino-pentyl) benzene;
bis-para(1,1-dimethyl-5-amino-pentyl)benzene;
1-isopropyl-2,4-meta-phenylene diamine;
m-xylylene diamine;
p-xylylene diamine;
di(para-amino-cyclohexyl)methane;
hexamethylene diamine;
heptamethylene diamine;
octamethylene diamine;
nonamethylene diamine;
decamethylene diamine;
diaminopropyl tetramethylene diamine;
3-methylheptamethylenediamine;
4,4-dimethylheptamethylene diamine;
2,11-diaminododecane;
1,2-bis-(e-amino-propoxy) ethane;
2,2-dimethyl propylene diamine;
3-methoxyhexamethylene diamine;
2,5-dimethyl-hexamethylene diamine;
2,5-dimethylheptamethylenediamine;
3-methyl-heptamethylene diamine;
5-methylnonamethylenediamine;
2,11-diamino-dodecane;
2,17-diaminoeicosadecane;
1,4-diamino-cyclohexane;
1,10-diamino-1, 10-dimethyl decane;
1,12-diamino-octadecane;
$H_2N(CH_2)_3O(CH_2)_2O(CH_2)_2NH_2$;
$H_2N(CH_2)_3S(CH_2)_3NH_2$;
$H_2N(CH_2)_3N(CH_3)(CH_2)_3NH_2$;

piperazine. A plurality of the above polyamines can also be employed, for example 2, 3, 4 or more of these amines, in preparing the polymer.

In addition to diamines one can also employ hydroxyamines $HORNH_2$ where R is akylene, cycloalkylene, arylic, etc., for example alkanolamine $HO—(CH_2)_nNH_2$ such as ethanolamine, propanolamine, butanolamine.

These polyamines and hydroxyamines can be employed with any of the polycarboxylic acids specified herein including dicarboxylic acids, tricarboxylic acids, tetracarboxylic acids, etc.

These polyamides, polyimides, polyamide-imides, polyamide-esters, polyamide-imide-esters, etc. can be modified by employing therein the BIC derivatives of this invention, either alone or in combination with other glycols and/or polyols, for example those specified herein.

Trimellitic acid or anhydride can be pre-reacted with various reactants and these products later reacted to form polyesters, polyester-amides, polyester-imides, etc. for example

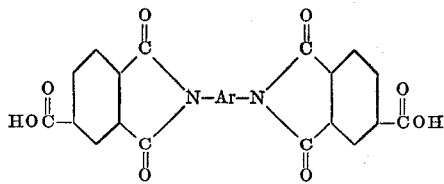

where Ar is an aromatic group, or

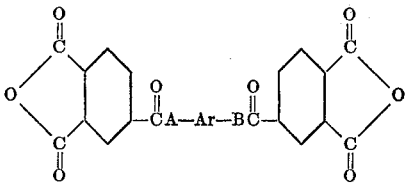

Such as described in U.S. Pat. 3,182,073, where A and B are O,

N,

S, etc., and Ar is an aromatic group such as phenyl, naphthyl, etc. These can be further reacted to form esters, ester-amides, ester-imides, etc.

If desired the following compositions may be utilized in modifying the resins of this invention:

(1) Monocarboxylic acids, either saturated or unsaturated.

(2) Fatty acids and glyceryl esters, also known as drying oils

Long oil (for example about 55–75% oil)
Medium oil (for example about 45–55% oil)
Short oil (for example about 30–45%)

(3) Natural resins for example Rosin, Copals and Ester gums, etc.

(4) Urea-aldehyde; triazine resins, melamine-aldehyde resins; melamine-formaldehyde resins modified with an alcohol, methanol, ethanol, propanol, butanol, etc.

(5) Phenol-aldehyde resins, Novolak resins, etc. such as aniline-aldehyde resins, etc.

(6) Terpenes (for example the Petrex type resins), etc.

(7) Diels-Alder addition products, for example

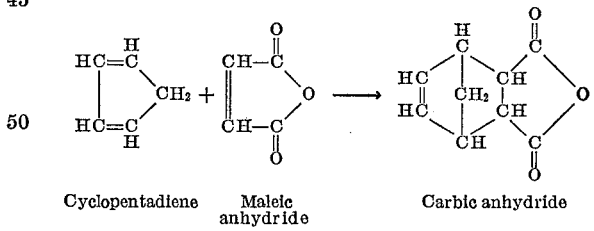

Cyclopentadiene    Maleic anhydride    Carbic anhydride (8) Unsaturated alcohols, for example allyl alcohol-glycol maleates, etc.

(9) Vinyl copolymers, for example reacted with maleic anhydride, such as styrene, vinyl chloride, vinylidene chloride, vinyl acetate, the acrylates and methacrylates, polyolefins, such as polyethylene, polypropylene, etc.

(10) Epoxide resins such as the reaction product of epichlorohydrin and bisphenol-A, etc.

(11) Silicone resins, etc.

(12) Cellulose acetate resins, etc.

(13) Polyamide resins such as the nylon type resins, etc.

(14) Buton resins (styrene-butadiene copolymers modified with maleic, etc.).

(15) Polyamines such as phenylene diamine, methylenedianiline, etc.

(16) Other modifying agents employed in the resin art.

We have also discovered that superior polymers having improved mechanical, chemical, electrical and thermal properties which are adaptable for use as insulation for electrical conductors such as for use as magnet wire insulation, as slot insulation in electrical apparatus, etc. can be prepared by incorporating both hydantoin and BIC derivatives into a polymer, which is also referred to herein as a "hydantoin-BIC polymer."

The hydantoin-BIC polymers may be prepared by one of the following methods:

(I) The hydantoin polymer and the BIC polymer are each prepared separately and then blended. This blend may be used as is (i.e. without further cooking) to coat a conductor or may be cooked prior to such use.

(II) The hydantoin polymer is first prepared and the ingredients of the BIC polymer are added thereto and cooked to prepare the hydantoin-BIC polymer and/or copolymer.

(III) The isocyanurate polymer is first prepared and the ingredients required to form the hydantoin polymer added thereto and cooked so as to form the hydantoin-BIC polymer and/or copolymer.

(IV) The ingredients required to form the hydantoin polymer and the ingredients required to form the BIC polymer are cooked simultaneously as a total fusion to prepare the hydantoin-BIC polymer and/or copolymer. This process includes both a simultaneous total fusion or where the ingredients are added in incremental amounts.

It should be understood that variations of any of the above processes can also be employed.

The term "hydantoin polymer" means a polymer containing hydantoin units or units convertible to hydantoin units such as the type of polymer described in Belgian application No. 678,282, filed March 3, 1966.

The term, "BIC polymer" means a BIC derivative or a polymer formed from a BIC derivative for example as illustrated herein. The preferred embodiment is a bridged tris(2-hydroxyethyl) isocyanurate, preferably the bis ether thereof.

"BIC polymers" include polyesters, polyester-amides, polyester-imides, polyester-amide-imides, etc. such as those described in this patent application. In addition, the BIC derivative itself may be added directly to the hydantoin polymer without the prior formation of a BIC polymer.

In Belgian patent application 678,282, filed Mar. 3, 1966, which is by reference incorporated into the present application, there are described polymers containing hydantoin groups which are produced by heating polyglycines and polyisocyanates and/or polyisothiocyanates, such as at 80–500° C., preferably in an organic solvent.

Preferably 1–3 moles isocyanate is heated with one mole of the NH-group of the polyglycine, such as at 140–280° C. The solvent is preferably N-methylpyrrolidone, dimethylsulphoxide, dimethylformamide, phenol, or cresol. A catalyst, such as a metal alcoholate or tertiary amine, may be used. The polymer is obtained as a solution and may be recovered by evaporation of the solvent.

The polyglycines employed have the formula

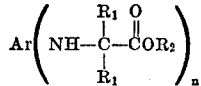

where Ar is an aromatic group, preferably benzene, azobenzene, naphthalene, anthracene, diphenyl, diphenylmethane, or diphenylether; $R_1$ is H, or an alkyl group; $R_2$ is hydroxy, amino, alkylamino, alkoxy, or aroxy; and $n=2$, 3 or 4. The polyiso(thio) cyanates may be aliphatic, cycloaliphatic, or aromatic compounds, such as polymethylene diisocyanates, p-phenylene diisocyanate, diphenylmethane diisocyanate, or naphthylene diisocyanate. Derivatives of these compounds may also be used.

The reaction that takes place between the BIC derivative or polymer derived therefrom and hydantoin is not understood. However, the following reactions are possible:

(1) Reaction of excess unreacted isocyanate groups of the hydantoin polymer with hydroxy, amino, carboxy, etc. groups in the BIC derivative or polymer.

(2) Reaction of hydantoic acid units of the hydantoin polymer with hydroxy, amino, etc. groups of the BIC derivative or polymer.

(3) Reaction of curing resins, curing agents, etc. tying the two units together in the precook, the curing operation, or in both.

(4) Combinations of the above processes plus others.

The weight percent of hydantoin polymer in the total polymer can vary widely depending on reactive groups, intended use, properties desired, etc. Thus, based on total polymer combination, one may employ from about 5% or less by weight of hydantoin polymer to about 95% or more by weight of hydantoin polymer, such as about 10%, for example about 20%, but preferably the hydantoin polymer is a minor part (i.e. less than about 50%) of the total polymer for example from 8–40% such as from 10–30%, but advantageously 10–20%. Similar percentages of hydantoin polymer can also be employed where the isocyanurate monomer is employed. The optimum amount of hydantoin polymer will vary in each case, such as from about 1 to 99% of the total polymer.

Hydantoin polymers are prepared by reacting a polyglycine with a polyiso(thio)cyanate. The reaction that takes place is not completely understood, but the course of the hydantoin reaction may be illustrated by the following reactions, employing the preferred difunctional derivatives:

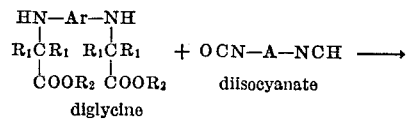

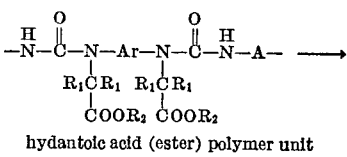

hydantoic acid (ester) polymer unit

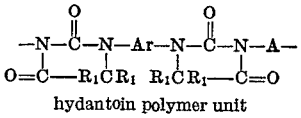

hydantoin polymer unit

The resulting polymer, or the polymer during the course of polymerization, may contain both hydantoic acid and hydantoin units on the same polymeric chain, for example a polymeric unit of the formula

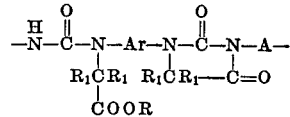

The relative arrangement of these units may be hetero, homo, block, etc.

It should be understood that the above reaction formulas are idealized to represent the general type of reaction and that some deviation or other reactions may occur during such reactions. Thus, the above reactions are presented to illustrate theoretical rather than actual reactions that may take place.

The general formula for the polyglycine is as follows:

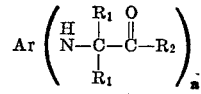

in which $R_1$ is hydrogen or an alkyl group; $R_2$ is hydroxy, amino, alkylamino, alkoxy, aroxy, etc.; $n=2, 3, 4$; and Ar is an aromatic group for example:

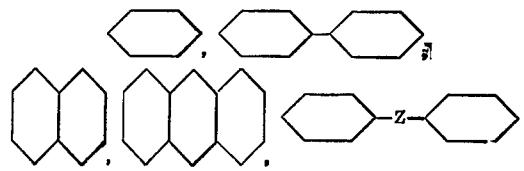

where Z is alkylene, O, S, SO, SO$_2$,

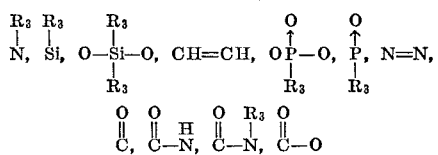

etc. where R$_3$ is alkyl.

Specific polyglycines are illustrated in the following Table I.

The general formula for polyisocyanates is at follows:

$$A(NCX)_n$$

in which X is O or S; $n=2$, 3 or 4, and A is the Ar of the polyglycine formula, as well as an aliphatic group such as alkylene, for example, methylene, polymethylene, cycloaliphatic such as cyclohexylene, hydrogenated aryl

TABLE I.—POLYGLYCINES

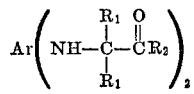

| Example | Ar | R$_1$ | R$_2$ |
|---|---|---|---|
| 1 | ⬡ | (meta-) | H | OCH$_3$ |
| 2 | ⬡⬡ (fused) | (1,5) | H | OC$_2$H$_5$ |
| 3 | ⬡⬡⬡ (fused) | (1,6) | H | OC$_2$H$_5$ |
| 4 | ⬡–⬡ | (4,4') | CH$_3$, CH$_3$ | OC$_2$H$_5$ |
| 5 | ⬡–O–⬡ | (4,4') | CH$_3$, CH$_3$ | OC$_2$H$_5$ |
| 6 | ⬡–CH$_2$–⬡ | (4,4') | CH$_3$, CH$_3$ | OC$_2$H$_5$ |
| 7 | ⬡–C(CH$_3$)$_2$–⬡ | (4,4') | H | OCH$_3$ |
| 8 | ⬡–N=N–⬡ | (4,4') | H | OC$_3$H$_7$ |
| 9 | ⬡–CO–⬡ | (4,4') | H | OC$_2$H$_5$ |
| 10 | ⬡–CH$_3$ | (para) | CH$_3$, CH$_3$ | OC$_2$H$_5$ |
| 11 | CH$_3$O–⬡–CH$_2$–⬡–OCH$_3$ | (4,4') | H | OC$_2$H$_5$ |
| 12 | ⬡ | (para) | H | OCH$_3$ |
| 13 | ⬡–⬡ | (3,3') | H | OC$_2$H$_5$ |
| 14 | ⬡–CH$_2$–⬡ | (3,3') | H | OC$_2$H$_5$ |
| 15 | ⬡–O–⬡ | (3,3') | CH$_3$, CH$_3$ | OC$_2$H$_5$ |
| 16 | ⬡–CH$_2$–⬡ | (4,4') | CH$_3$, H | OH |
| 17 | ⬡–O–⬡ | (4,4') | H | OC$_2$H$_5$ | such as tetrahydronaphthalene, etc. Specific polyisocyanates are illustrated in the following Table II.

TABLE II.—POLYISOCYANATES
$A(NCX)_n$

| Example | A | X | n |
|---|---|---|---|
| 1 | ⬡ | (meta) | 2 |
| 2 | ⬡⬡ (naphthalene) | (1,5) | 2 |
| 3 | ⬡⬡ (naphthalene) | (1,8) | 2 |
| 4 | ⬡—⬡ | (4,4') | 2 |
| 5 | ⬡—O—⬡ | (4,4') | 2 |
| 6 | ⬡—CH₂—⬡ | (4,4') | 2 |
| 7 | ⬡—C(CH₃)₂—⬡ | (4,4') | 2 |
| 8 | ⬡—N=N—⬡ | (4,4') | 2 |
| 9 | ⬡—CO—⬡ | (4,4') | 2 |
| 10 | ⬡ with CH₃ | (para) | 2 |
| 11 | ⬡ with OCH₃, OCH₃ | (para) | 2 |
| 12 | CH(⬡)₃ | (4,4',4'') | 3 |
| 13 | ⬡ | (para) | 2 |
| 14 | (CH₂)₄ | (1,6) | 2 |
| 15 | ⬡S | (para) | 2 |
| 16 | ⬡⬡ (tetrahdro) | (1,5) | 2 |
| 17 | ⬡—CH₂—⬡ | (4,4') | 2 |
| 18 | —CH₂—⬡—CH₂— | — | 2 |
| 19 | ⬡(CH₃)—CH₂—⬡(CH₃) | (4,4') | 2 |
| 20 | S⬡—CH₂—⬡S | (4,4') | 2 |

The following examples are presented for purposes of illustration and not of limitation.

EXAMPLE I

Preparation of BIC derivatives with ether bridges

One thousand (1,000) parts of THIC and 50 parts of xylol are added to a reaction flask and heated to 280° F. to yield a molten mass. Ten (10) parts of p-toluene sulfonic acid are added as catalyst and the temperature of the mass is raised to 430° F. over a period of three hours during which period the water of etherification is carefully collected and measured. When one mole of water is collected for each two moles of THIC, the reaction mixture is blown with $CO_2$ to remove the xylol. The product is then poured into a tray and allowed to solidify. The product is predominately the monoether of THIC:

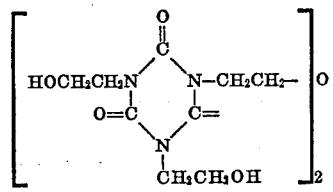

EXAMPLE IA

A polyester is prepared from the following reactants:

Equivalent, percent
DMT _____ 45.5
Diethylene Glycol _____ 22.7
BIC Ether (Ex. I) _____ 31.8

The reactants are added to a three-necked vessel fitted with a thermometer, stirrer, distillate column, Dean & Stark Trap, and an addition funnel. A carbon dioxide blanket is maintained on the system. The system is heated to fusion and when the temperature reaches about 300° F. an esterification catalyst, PbO, 0.1% by weight based on total charge, is added. Heating is continued for a period of about six hours as alcohol is distilled off under esterification conditions during which the temperature rose to about 440–450° F.

Since the following examples are similarly prepared, they are presented in tabular form with the most relevant details being presented in Table A. DMT is dimethyl terephthalate. EG is ethylene glycol.

For convenience the equivalents percent employed in the following Tables will be rounded out to the closest whole number.

TABLE A.—POLYESTERS

| Ex. | Acid | Equiv. percent | Glycol | Equiv. percent | Polyol | Equiv. percent |
|---|---|---|---|---|---|---|
| 1 | DMT | 45 | | | BIC ether (Ex. I) | 55 |
| 2 | Dimethyl isophthalate (DMI) | 45 | EG | 25 | do | 30 |
| 3 | $\begin{bmatrix}\overset{O}{\underset{\parallel}{C}}{-}\bigcirc{-}\overset{O}{\underset{\parallel}{C}}OMe\end{bmatrix}_2$ | 50 | Diethylene glycol | 21 | do | 29 |
| 4 | Trimellitic anhydride (TMA) | 45 | do | 30 | do | 25 |
| 5 | DMT | 50 | E.G. | 20 | {BIC ether (Ex. I) / Glycerol} | {25 / 5} |
| 6 | {DMT / Adipic acid} | {40 / 5} | E.G. | 25 | BIC ether (Ex. I) | 30 |
| 7 | DMT | 45 | Neopentyl glycol | 20 | do | 35 |
| 8 | {DMT / DMI} | {25 / 25} | Diethylene glycol | 21 | do | 29 |
| 9 | {$\begin{bmatrix}\overset{O}{\underset{\parallel}{C}}{-}\bigcirc{-}\overset{O}{\underset{\parallel}{C}}OMe\end{bmatrix}_2$ / DMT} | {31 / 19} | Diethylene glycol | 21 | do | 29 |
| 10 | DMT | 45 | Butanediol-1,4 | 25 | {BIC ether (Ex. I) / Pentaerythritol} | {25 / 5} |
| 11 | DMT | 45 | Diethylene glycol | 25 | {BIC ether (Ex. I) / THIC} | {15 / 15} |

EXAMPLE II

Preparation of polyester-amide and/or imide

| | Equivalent, percent |
|---|---|
| DMT | 23 |
| TMA | 27 |
| Diethylene glycol | 14 |
| BIC (Ex. I) ether | 13 |
| $NH_2{-}\bigcirc{-}CH_2{-}\bigcirc{-}NH_2$ | 23 |

All reactants are added to three necked flask equipped with a thermometer, stirrer, distillate column, Dean & Stark Trap and an additional funnel. A carbon dioxide blanket is maintained on the system. The system is heated and when a temperature of about 300° F. is reached, the catalyst (PbO) is added, 0.1% based on total charge. Heating is continued for a period of about six hours as alcohol is distilled off during which period the temperature uses to about 440° F.

Since the following examples are similarly prepared they are presented in tabular form with the most relevant details being presented in Table B.

TABLE B.—POLYESTER-AMIDE AND/OR IMIDE

| Ex. | Acid | Equiv. percent | Glycol | Equiv. percent | Polyol | Equiv. percent | Polyamine | Equiv. percent |
|---|---|---|---|---|---|---|---|---|
| 1 | DMT | 50 | Diethylene glycol | 14 | BIC ether (Ex. I) | 14 | $NH_2{-}\bigcirc{-}O{-}\bigcirc{-}NH_2$ | 22 |
| 2 | TMA | 50 | EG | 15 | do | 15 | $NH_2{-}\bigcirc{-}NH_2$ | 20 |
| 3 | Pyromellitic anhydride | 45 | EG | 15 | do | 20 | $NH_2{-}\bigcirc{-}\underset{\underset{CH_3}{\mid}}{\overset{\overset{CH_3}{\mid}}{C}}{-}\bigcirc{-}NH_2$ | 20 |
| 4 | {DMT / TMA} | {29 / 21} | | | BIC ether (Ex. I) glycerol | 30 | $NH_2{-}\bigcirc{-}\bigcirc{-}NH_2$ | 20 |
| 5 | {DMI / TMA} | {18 / 32} | Diethylene glycol | 15 | BIC ether (Ex. I) | 15 | $NH_2{-}\bigcirc{-}CH_2{-}\bigcirc{-}NH_2$ | 20 |
| 6 | TMA | 45 | | | do | 40 | $NH_2{-}\bigcirc{-}O{-}\bigcirc{-}NH_2$ | 15 |
| 7 | $\begin{bmatrix}\overset{O}{\underset{\parallel}{C}}{-}\bigcirc{-}\overset{O}{\underset{\parallel}{C}}OMe\end{bmatrix}_2$ | 45 | Diethylene glycol | 20 | do | 15 | $NH_2{-}\bigcirc{-}O{-}\bigcirc{-}NH_2$ | 20 |
| 8 | {TMA / DMT} | {25 / 25} | do | 20 | do | 15 | $NH_2{-}\bigcirc{-}NH_2$ | 15 |
| 9 | {$\begin{bmatrix}\overset{O}{\underset{\parallel}{C}}{-}\bigcirc{-}\overset{O}{\underset{\parallel}{C}}OMe\end{bmatrix}_2$ / TMA} | {25 / 25} | do | 15 | do | 15 | $NH_2{-}\bigcirc{-}CH_2{-}\bigcirc{-}NH_2$ | 20 |

A polycarboxylic acid may also be pre-reacted with a polyamine or a polyol and then reacted in accordance with this invention as illustrated in the following examples.

EXAMPLE III

One mole of trimellitic anhydride and 0.5 mole of

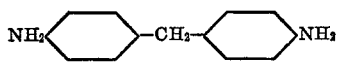

are reacted in 500 g. of N-methylpyrrolidone to yield a product which is predominantly

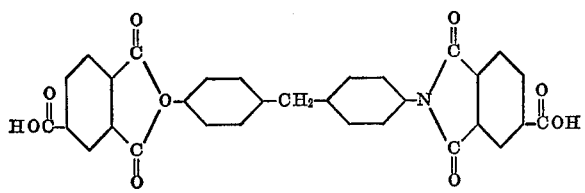

EXAMPLE IV

Six (6) moles of TMA and three (3) moles of hydroquinone diacetate are heated with stirring for about two hours up to a maximum temperature of about 300° F., the acetic acid being distilled off as formed. The product is predominantly p-phenylene-ibs(trimellitate) dianhydride

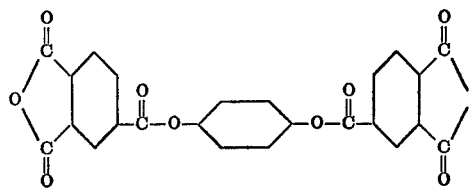

These preformed acids or anhydrides are employed to prepare the resins of this invention as illustrated in the following Tables C and D.

TABLE C

Resins prepared from 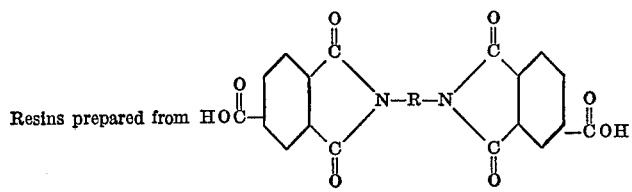

| Example | Preformed acid R= | Equiv. percent | Additional acid | Equiv. percent | Glycol | Equiv. percent | Polyol | Equiv. percent |
|---|---|---|---|---|---|---|---|---|
| 1 | ⌬ | 45 | | | EG | 25 | BIC ether (Ex. I) | 30 |
| 2 | ⌬-CH₂-⌬ | 30 | DMT | 20 | | 20 | do | 30 |
| 3 | ⌬-O-⌬ | 45 | | | | | do | 55 |
| 4 | ⌬-C(CH₃)₂-⌬ | 45 | | | | | do | 55 |
| 5 | ⌬-⌬ | 22 | DMT | 22 | EG | 25 | do | 31 |
| 6 | ⌬-CH₂-⌬ | 45 | | | | | do | 55 |
| 7 | ⌬ | 50 | | | Diethylene glycol | 20 | do | 30 |

TABLE D

Resins prepared from 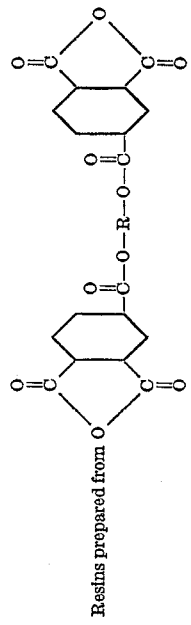

| Example | Preformed acid R= | Equiv. percent | Additional acid | Equiv. percent | Glycol | Equiv. percent | Polyol | Equiv. percent | Amine | Equiv. percent |
|---|---|---|---|---|---|---|---|---|---|---|
| 1 | (p-phenylene) | 25 | DMT | 25 | | | BIC ether (Ex. I) | 30 | (p-aminophenyl) -NH₂ | 20 |
| 2 | bis(isopropylidene diphenyl) | 50 | | | Diethylene glycol | | do | 20 | (4-aminophenoxy phenyl) | 20 |
| 3 | (diphenyl ether) | 45 | | | | 10 | do | 35 | (4-amino-4'-methyl biphenyl) | 20 |
| 4 | (4,4'-methylene diphenyl) | 45 | | | | | do | 40 | (bis(4-aminophenyl) isopropylidene) | 15 |

EXAMPLE V

One mole of N,N'-bis(carbethoxyisopropylidene) 4,4'-diamino diphenyl methane

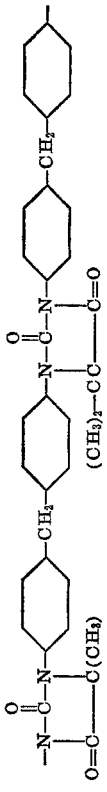

is added at 300° F. to a solution of one mole of 4,4'-diisocyanate-diphenyl methane

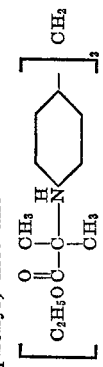—CH₂——NCO in 1000 parts of cresol and heated for about ten hours at 440° F. employing an ethoxy tin catalyst to form a hydantoin polymer having repeating units of the idealized formula:

The hydantoin polymer of Example V is blended with the following polymers in the ratios shown.

TABLE E.—HYDANTOIN-BIC RESIN BLEND

| Example | Hydantoin polymer | Parts by weight | Polymer example | Parts by weight |
|---|---|---|---|---|
| 1 | Example V | 25 | Example 1A | 75 |
| 2 | do | 35 | Table A 1 | 65 |
| 3 | do | 20 | Table A 3 | 80 |
| 4 | do | 40 | Table A 4 | 60 |
| 5 | do | 20 | Table A 6 | 80 |
| 6 | do | 20 | Table A 8 | 80 |
| 7 | do | 10 | Example II | 90 |
| 8 | do | 10 | Table B 1 | 90 |
| 9 | do | 15 | Table B 5 | 85 |
| 1 | do | 10 | Table B 7 | 90 |
| 11 | do | 10 | Table B 9 | 90 |
| 12 | do | 25 | Table C 1 | 75 |
| 13 | do | 25 | Table C 2 | 75 |
| 14 | do | 20 | Table C 5 | 80 |
| 15 | do | 30 | Table C 6 | 70 |
| 16 | do | 10 | Table D 1 | 90 |
| 17 | do | 15 | Table D 4 | 85 |

Other hydantoin polymers besides that described in Example V can also be employed. Referring to the polyglycine reactants of Table I and the polyisocyanate reactants of Table II, these can be reacted in the manner of Example V or Belgium patent application 678,282 to yield the hydantoin polymers which can be blended with BIC derivatives in the manner of this invention. These are presented in Table F.

TABLE F.—HYDANTOIN POLYMERS

| | Reactants | | | |
|---|---|---|---|---|
| | Polyglycine | | Polyisocyanate | |
| Example | Table I Example— | Equiv. | Table II Example— | Equiv |
| 1 | 1 | 1.0 | 2 | 1.2 |
| 2 | 1 | 1.0 | 5 | 1.2 |
| 3 | 1 | 1.0 | 6 | 1.9 |
| 4 | 1 | 1.0 | 7 | 1.4 |
| 5 | 1 | 2.0 | 14 | 1.6 |
| 6 | 5 | 1.0 | 4 | 4.0 |
| 7 | 5 | 1.0 | 6 | 4.0 |
| 8 | 5 | 1.0 | 10 | 1.0 |
| 9 | 6 | 1.0 | 5 | 2.0 |
| 10 | 6 | 1.0 | 6 | 1.2 |
| 11 | 6 | 1.0 | 7 | 1.4 |
| 12 | 6 | 1.0 | 10 | 2.2 |
| 13 | 7 | 1.0 | 5 | 1.2 |
| 14 | 7 | 1.0 | 6 | 1.6 |
| 15 | 8 | 1.0 | 5 | 1.2 |
| 16 | 8 | 1.0 | 6 | 2.0 |
| 17 | 11 | 1.0 | 6 | 1.8 |
| 18 | 14 | 1.0 | 5 | 1.2 |
| 19 | 15 | 1.0 | 4 | 1.3 |

EXAMPLE VI

The process of Example I is repeated except that one mole of HCHO (as paraformaldehyde) is employed for each two moles of THIC. Heating is continued until two (2) moles of $H_2O$ are removed for each mole of HCHO to yield a product which was predominantly $$\left[ \begin{array}{c} \text{HOCH}_2\text{CH}_2\text{N} \overset{\text{O}}{\underset{\text{O=C}}{\diagup}} \overset{\text{C}}{\diagdown} \text{N}-\text{CH}_2\text{CH}_2\text{O}- \\ \overset{\text{C=O}}{\diagdown} \overset{\text{N}}{\diagup} \\ \text{CH}_2\text{CH}_2\text{OH} \end{array} \right]_2 \text{CH}_2$$

EXAMPLE VII

Two (2) moles of the following $$\text{HOCH}_2\text{CH}_2\text{N} \overset{\overset{\overset{\text{O}}{\|}}{\text{C}}}{\underset{\text{O=C}}{\diagup}} \overset{\text{C=O}}{\diagdown} \text{N}-\text{CH}_2\text{CH}_2\text{OH}$$
$$\underset{\text{Na}}{\text{N}}$$

are placed in an inert solvent such as xylol and one (1) mole and $(\text{ClCH}_2\text{CH}_2)_2\text{O}$ is added thereto to yield:

[Structure: bis-isocyanurate with $-N-CH_2CH_2OCH_2CH_2N-$ bridge, with $CH_2CH_2OH$ groups]

EXAMPLE VIII

The process of Example VII is repeated except that $$\text{ClCH}_2-\!\!\!\bigcirc\!\!\!-\text{CH}_2\text{Cl}$$

is employed to yield:

[Structure: bis-isocyanurate with $-N-CH_2-C_6H_4-CH_2-N-$ bridge, with $CH_2CH_2OH$ groups]

EXAMPLE IX

The process of Example VII is repeated except that $\text{ClCH}_2\text{—CH=CH—CH}_2\text{—Cl}$ is employed to yield:

[Structure: bis-isocyanurate with $-NCH_2CH=CH-CH_2N-$ bridge, with $CH_2CH_2OH$ groups]

The above are representative examples of bis-isocyanurates that can be employed to prepare the polymers of this invention by substituting the specific bis-isocyanurate in any of the above BIC ether formulations.

The BIC derivatives of this invention can be reacted to form resins in the manner described for THIC resins to produce BIC resins and wire enamels which are equal or superior to the corresponding resins produced from THIC.

By way of example, the following patents and patent applications describe polymers which are characterized by the presence of isocyanurate units, such as hydroxyalkyl-isocyanurates and most preferably tris(hydroxyalkyl) isocyanurate units. BIC derivatives can be substituted for THIC in the following patents to produce the resins of the present invention as well as corresponding wire enamels and other insulating materials.

(1) U.S. Pat. 3,297,78, relating to melamine-aldehyde resin modified polyester reaction products.

(2) U.S. Pat. 3,312,645 relating to oil-modified polyester reaction products and oil-modified phenol-aldehyde resin reaction products.

(3) U.S. Pat. 3,342,780 relating to the reaction product of a dibasic polycarboxylic acid and tris(2-hydroxyethyl) isocyanurate.

(4) U.S. Pat. 3,249,578 relating to a coating composition of a dibasic polycarboxylic acid/tris (2-hydroxyethyl) isocyanurate.

(5) U.S. patent application S.N. 593,729, filed Nov. 14, 1966, relating to polyester-amide and/or imides containing tris(2-hydroxyethyl) isocyanurate.

(6) Belgian Pat. 1,456,575 relating to the reaction of a terephthalic acid, a polyol and tris(2-hydroxyethyl) isocyanurate and/or tris(2-carboxyethyl)-isocyanurate and a condensation product of trimellitic-triethylene glycol and an aromatic amine.

(7) British Pat. 1,049,650 relating to the polyester of benzophenone-dicarboxylic acid and tris(2-hydroxyethyl) isocyanurate.

(8) Belgian Pat. 1,478,938 relating to polyester-polyimides containing tris(2-hydroxyethyl) isocyanurate.

These patents and patent applications are incorporated by reference into the patent application as if a part hereof.

WIRE ENAMEL EXAMPLE I

When resins of the present invention are to be employed as magnet wire enamels, the resins are applied to the wires from solution by well-known methods. For optimum results we have found that solutions containing from about 20 to 40 percent resin solids should be employed. These solutions can be prepared by diluting higher concentration resin solutions with any of the resin solvents mentioned above.

The method of applying the resin to wire comprises passing the wire through the resin solution, through a suitable die, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution. Although the die sizes are not critical, we prefer to employ dies which provide a clearance of from two to four mils around the wire. The speed at which the wire is passed through the resin solution and the temperature at which the oven is maintained depend on the particular resin solution employed, the build of enamel desired, the length of the oven in which the coated wire is cured, and the molecular weight of the resin used in the coating operation. We have found that an enamel build on a 40.3 mil or 18 wire round copper wire of about 3 mils (diameter of enameled wire less diameter of bare wire) may be obtained by passing the wire through a solution containing 25-35%, by weight, of a suitable resin and through a heating tower 18 feet long at speeds of from about 15 to 100 feet per minute when the temperature of the curing oven is maintained at from about 800° F. to 1000° F. In general, the higher the wire speed, the higher is the optimum wire curing tower temperature. In the coating operation just described, the wire is generally passed through the resin solution and a wire tower six times to obtain the desired build. In addition, the wire can be coated by dip application, groove rolls, etc.

In order to insure complete curing of the resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be the soluble salts of Zn, Pb, Ti, Cd, Bo, Th, etc., for example zinc octoate, cadmium octoate, copper naphthenate, tetraisopropyl titanate, tetrabutyl titanate, etc., aromatic polyisocyanates, aliphatic polyisocyanates, etc. Examples of polyisocyanates are those disclosed in U.S. Pat. 3,211,585 including the blocked isocyanates which are by reference incorporated herein as if part hereof. Where metal-containing curing catalysts are employed we have obtained satisfactory results using from about 0.05 to 4.0 or more percent, by weight, of the metal element of the catalyst based on the total resin solids. Preferably, we use sufficient metal-containing catalyst to give about 0.1-2.0 percent metal based on the total resin solids and when using the polyisocyanates we use about 20-25 percent, by weight, of the isocyanate based on the total resin solids present. Where other cross-linking resins are employed such as melamine-aldehyde resins or modified derivatives thereof, one employs 1-10%, such as 1.5-8% but preferably 2-4% based on total solids.

Where the resins of this invention are to be employed as slot insulation in dynamoelectric machines, it is necessary to form cured sheets or films of the resin. This can be accomplished by any of the conventional film-forming methods such as casting a solution of resin and heating the casting to drive off the solvent and curing the resin. Films can also be formed by extruding viscous solutions of the resins into a heated chamber where curing takes place. Film formed from these resins are tough, flexible products having high dielectric strength, thermal stability and high tensile strength. These films may be used as slot insulation on dynamoelectric machines by lining the slots in armatures with the film and placing the insulated windings into the lined slots. These films can also be used as the dielectric material in capacitors and are particularly valuable for use in aluminum foil type capacitors.

In order to determine whether the insulation on a magnet wire will withstand mechanical, chemical, electrical and thermal stresses encountered in winding machines and electrical apparatus, it is customary to apply the resin to a conductor and to subject the enameled wire to a series of tests which have been designed to measure the various properties of the enamel on the wire.

The wire enamels were prepared in a conventional manner. The resins prepared herein were diluted with a mixed solvent to a resin content of 25-35% by weight. The mixed solvent has a weight ratio of 6:3 to 6:4 cresylic acid to aromatic solvent. The aromatic solvent contained equal parts by weight of Solvesso 100 and Solvesso 150. Other solvents include halogenated coal tar solvents and solvents such as N-methyl pyrrolidene, dimethyl sulfoxide, dimethylformamide and other similar solvents alone or in combination.

WIRE ENAMEL EXAMPLE II

The resins of the present invention possess excellent mechanical, chemical, thermal and electrical properties. The desirable properties will depend on the particular application to which they are applied. Where the resins are employed as wire enamels, the desired properties will depend on the conditions under which the wire enamels are employed. In general, we prefer that the wire enamels of this invention possess the following properties:

(1) MIL cut through temperature—the power output of motors and generators can be increased by increasing the current density in the magnet wires of these machines. However, as the current density is increased, the operating temperature of the magnet wires is also increased. In order to determine whether a magnet wire may be employed at high temperatures, it is necessary to measure the properties of the enameled conductor at high temperatures. One measure of this is the cut through temperature of the enamel. In general we prefer the wire enamel to have a cut through temperature of at least 350° F., such as at least 500° F. but preferably at least 600° F.

(2) Percent elongation—in order to determine another mechanical property of the enamel and its flexibility, the percent elongation of the enamel is determined. This property is a very important attribute of the enamel when subjected to the stresses of automatic winding. In general, we prefer a percent elongation of at least 25%, such as 28%, but preferably above 30%.

(3) A more severe test for flexibility is the 25% elongation +1X. A satisfactory wire enamel should pass this test.

(4) The Scott Twist Test is employed to determine the mechanical properties of the enamel and is reported as the number of twists before defects appear on the enamel. In general a satisfactory wire enamel should have a Scott Twist rating of at least about 130 such as at least about 140, but preferably at least about 150.

(5) The Dielectric Twisted Pair Test is a measure of the dielectric strength of the wire enamel. In general a satisfactory wire enamel having a build of about 3 mils should have a value of at least about 7500 v., such as at least about 9500 v., but preferably at least about 10,000 v.

(6) The Emerson Scrape Test is particularly important in determining the probability of a break occurring in the wire under high speed winding. In general where the Emerson Scrape value for the bare wire itself is determined and the value for the wire enamel approaches this value, conditions of winding which would not break the wire will not affect the wire enamel itself. Thus, where the wire itself has an Emerson Scrape value of about 30-31, we prefer that the wire enamel have a value of at least about 20, such as at least about 25, but preferably about the same value that the wire itself possesses, i.e. at least about 30.

One convenient method of upgrading the properties of the resins of this invention is to employ a tirazine curing agent in preparing the wire enamel, for example, a melamine-aldehyde resin, or a modified melamine-aldehyde resin such as a melamine-formaldehyde resin modified with an alcohol or its equivalent such as an alkanol, e.g., methanol, ethanol, propanol, butanol, etc. We have prepared wire enamels by employing at least about 2%, by weight, of a melamine-formaldehyde resin (or a melamine-formaldehyde resin modified with an alcohol such as a lower alkanol) based on resin such as about 1 to 10%, but preferably 2 to 5%, with or without other curing agents such as metal catalysts.

The resins of this invention yield wire enamels capable of operation at temperatures above 200° C. The commerical importance of such resins is so well recognized that they are known to the trade as "200 Type Wire Enamels."

The resins of this invention are capable of producing 200 type Enamels. Thus, the specific illustration examples presented herein when applied as wire enamels are capable of producing 200 type Enamels. These properties are further improved by the use of melamine-aldehyde resins such as melamine-formaldehyde resins in conjunction with a curing metal such as tetraalkyl titanates. Specific examples have been cured with 2–4% melamine-formaldehyde resins of the film-forming type and about .05–0.2% titanium (calculated as metal) added as tetrabutyl titanate based on total weight of the active ingredients of the enamel.

A wire enamel prepared from the resin of Example IA is used to coat a #18 copper wire (0.0403 in diameter) employing 0.1% titanium (as tetrabutyl titanate) and 3.0% melamine-formaldehyde resin and cured in the conventional manner. The enamelled wire is compared to a corresponding enamelled wire prepared from the corresponding resin where THIC is employed in place of the BIC derivatives. The properties with the BIC resin are equal to or better than corresponding THIC resins.

Similar results are obtained from wire enamels prepared from other BIC resins of this invention as presented in the above examples. Similarly hydantoin-BIC blends, for example, the resins yield excellent wire enamels, preferably when cured with titanium 0.1% as the metal (tetrabutyl titanate) and 2.5–3.0% melamine-formaldehyde resins.

As stated above, BIC derivatives can be employed in place of THIC in resins i.e. as polyesters, polyester-amides, polyester-imides, polyester-amides, polyester amide-imides, etc. to yield superior wire enamels. In addition both BIC derivatives and THIC can be employed in the same resin.

Wires insulated with the wire enamels containing BIC derivatives of this invention can be further improved by applying over the enamel layer an overcoat of a highly linear theromplastic polymer.

The thickness of the outer layer of the linear polymer normally is preferably at least 10% of the thickness of the inner enamel layer but substantially thinner than the inner layer. Such an outer layer improves physical properties, particularly improving heat shock.

For the thermoplastic linear polymer of the outer layer, a polyester resin obtained by reacting a dihydric alcohol with an aromatic dicarboxylic acid is particularly suitable. Preferably, the linear polymer is a glycol-terephthalate polyester of predominantly high molecular weight, such as polyethylene terephthalate known in the trade as "Dacron" or "Mylar." Examples of other such linear polyesters well adapted for this use are polycyclohexylene dimethyleneterephthalate known in the trade as "Kodel" of the fiber-forming type, a polyethylene terephthalate known as "celanese Polyester Fortrel" (a product of Fiber Industries, Inc.), and a polyethylene terephthalate-isoterephthalate product of Goodyear known as "Vicron." Also suitable for this purpose is a polyaromatic polycarboxylic aromatic imide known as Du Pont's "M–L" for example those disclosed in U.S. Pat. 3,179,634 which has good thermal life, and, like the terephthalic base materials, can eliminate heat and solvent shock and meet the other requirements of a higher temperature magnet wire. Other equivalent materials can be employed.

The linear thermoplastic polymer of the outer insulating layer of a wire made according to the invention acts as a rubber-like band of high tensile strength which, when the conductor is bent or stretched and heated, prevents heat shock in the underlying layer of enamel. Further, the greater toughness and insolubility of this outer layer greatly enhances the physical and chemical properties of the finished wire. Since highly linear polymers such as dihydric alcohol-terephthalate polyesters have excellent heat resistance, they do not detract from the overall thermal properties of the finished wire.

The outer layer of thermoplasitc linear polymer should preferably be at least about 10% of the thickness of the inner layer of thermosetting non-linear polyesteramide. This is particularly so for round wire "Triple," sizes 8 through 40. For square and rectangular wire as well as round wire, "Single" and round wire "Heavy," the outer layer should constitute at least 13% of the total thickness or "build" of the combined inner and outer layers. On the other hand, the outer layer should be substantially thinner than the inner layer and preferably not greater than 25% of the inner layer thickness. Normally, the desired ratio of the two layer thicknesses can be obtained by applying from three to seven coats of the inner layer material and one or at most two coats of the outer layer material, each coat being applied by a wiping die and overcured in the conventional manner before application of the next coat.

III. OVERCOAT EXAMPLES

The wire enamels produced from the above II Wire Enamel Examples are overcoated with the following:

(1) Dacron
(2) Kodel
(3) Fortrel
(4) Vicron
(5) M–L Polyimide Polymer to produce a superior wire insulator having excellent heat shock.

Although the utility of the resins of our invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates.

These wire enemals can also be overcoated with the polyamide-imides of Ser. No. 423,331 filed Jan. 4, 1965 which is incorporated herein as part hereof. For example, the present wire enamels may be overcoated with the polyamide-imides of trimellitic anhydride and polyamines such as phenylene diamine. A suitable commercial overcoat is Amoco 1A Type 10.

While representative embodiments of this invention have been presented, it will be apparent to those skilled in the art that various changes and modifications may be made without departing from the spirit and scope of the invention.

For example, equivalents of the bridging group described herein can be employed, such as the thio analogues of the oxygen atom in the bridging group.

etc. In addition, other modifications of melamine resins can be employed, such as those of the "Cymel 301" type (American Cyanamid) which has been described as hexamethylene methoxy melamine.

Having thus described our invention, what we claim as new and desire to obtain by Letters Patent is:

1. A bis-bridged isocyanurate characterized by the formula

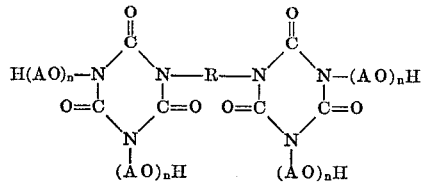

where R is —Alkylene—O—Alkylene—,

—Alkylene—O—CH$_2$—O—Alkylene ethylene, propylene, butylene, phenylene, naphthyl, —Alkylene—O—CH—O—Alkylene—,
$\quad\quad\quad\quad\quad\quad\,$|
$\quad\quad\quad\quad\quad\,$CH$_3$ —Alkylene—O—C—O—Alkylene—, ethylene, propylene, butylene,
$\quad\quad\quad\quad\quad\,$||
$\quad\quad\quad\quad\quad\,$O phenylene, naphthyl, —CH$_2$—⌬—CH$_2$—

—CH=CH—, —C≡C—, or —Alkylene-urethane group-Alkylene—, A is an alkylene group having up to 8 carbon atoms, Alkylene is an alkylene group having up to 8 carbon atoms, and $n$ is a number.

2. The bis-isocyanurate of claim 1 where R is

—Alkylene—O—Alkylene—

3. The bis-isocyanurate of claim 2 where Alkylene and A are ethylene or propylene and $n$ is 1.

4. The bis-isocyanurate of claim 3 having the formula

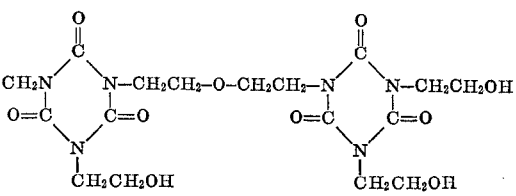

References Cited

UNITED STATES PATENTS

| | | |
|---|---|---|
| 3,035,942 | 5/1962 | Cooke et al. _____ 260—248 X |
| 3,553,215 | 1/1971 | Zalewski et al. _____ 260—248 |

JOHN M. FORD, Primary Examiner

U.S. Cl. X.R.

260—77.5 NC